United States Patent
Berkowitz et al.

(10) Patent No.: US 7,249,619 B2
(45) Date of Patent: Jul. 31, 2007

(54) SAWING DEVICE HAVING AN ADJUSTABLE PROFILE

(75) Inventors: Igor Berkowitz, Zefat (IL); Gavriel Spector, Kfar Veradim (IL)

(73) Assignee: Dimar Ltd., Shlomi (IL)

( * ) Notice: Subject to any disclaimer, the term of this patent is extended or adjusted under 35 U.S.C. 154(b) by 0 days.

(21) Appl. No.: 10/513,710

(22) PCT Filed: Apr. 30, 2003

(86) PCT No.: PCT/IL03/00348

§ 371 (c)(1),
(2), (4) Date: Jun. 28, 2005

(87) PCT Pub. No.: WO03/095164

PCT Pub. Date: Nov. 20, 2003

(65) Prior Publication Data

US 2006/0070506 A1      Apr. 6, 2006

(30) Foreign Application Priority Data

May 9, 2002      (IL)      ..................... 149552

(51) Int. Cl.
   *B27C 1/00*      (2006.01)
   *B27C 5/00*      (2006.01)
   *B27G 13/00*      (2006.01)

(52) U.S. Cl. ..................... 144/218; 144/237; 144/238; 83/664; 83/698.31

(58) Field of Classification Search ................. 144/237, 144/231, 218, 223, 238, 363; 83/838, 835, 83/366, 664, 676, 665, 666, 698.31, 698.41; 29/428, 525.01; 407/31, 40, 41, 48, 60
See application file for complete search history.

(56) References Cited

U.S. PATENT DOCUMENTS

| 498,144 | A | * | 5/1893 | Vose ............................. 12/94 |
| 2,788,812 | A | * | 4/1957 | Jacobs ....................... 144/237 |
| 4,279,280 | A | * | 7/1981 | Pairis ........................ 144/48.6 |
| 4,589,458 | A | * | 5/1986 | McCord, Jr. ................ 144/238 |
| 4,729,193 | A | * | 3/1988 | Gant et al. .................. 451/342 |
| 5,063,980 | A | * | 11/1991 | Schultz ....................... 144/223 |
| 5,090,287 | A | * | 2/1992 | Chezem ....................... 83/838 |
| 5,309,962 | A | * | 5/1994 | McCord et al. ............. 144/237 |
| 5,368,079 | A | * | 11/1994 | Benway ...................... 144/237 |
| 6,675,849 | B1 | * | 1/2004 | Lackley ...................... 144/363 |
| 2004/0244558 | A1 | * | 12/2004 | Lowder et al. ............... 83/665 |

FOREIGN PATENT DOCUMENTS

WO      WO 8904748 A1 *      6/1989

* cited by examiner

*Primary Examiner*—Bena Miller
(74) *Attorney, Agent, or Firm*—Wolf, Block, Schorr & Solis-Cohen LLP; William H. Dippert

(57) ABSTRACT

A device for adjusting a sawing device's width, wherein the sawing device comprises at least two circular blades 10, 12, facing each other and adjacently positioned, and a fastener 44 adapted to assemble the blades together. The device for adjusting the sawing device's width comprises a wavy annular spring 14 provided between the blades, a recess 42 provided in each of the blades, wherein the recesses are positioned opposite to one another and wherein said wavy annular spring is received within the recesses, an adjustment member 32 adapted to force the blades together against said wavy annular spring or to part them so as to maintain a predetermined distance between the blades. The distance between the blades is set to present a desired cutting width.

6 Claims, 1 Drawing Sheet ary, the present invention relates to a sawing device having an adjustable profile.

SAWING DEVICE HAVING AN ADJUSTABLE PROFILE

FIELD OF THE INVENTION

The present invention relates to sawing devices. More particularly, the present invention relates to a sawing device having an adjustable profile.

BACKGROUND OF THE INVENTION

Occasionally, when a board covered with a brittle surface such as melamine, plastic-laminated, or other type of veneer needs to be sawn; the brittle material tends to break in an uncontrolled manner, especially at the edges of the board.

Two types of circular saw blades are usually used in order to avoid breaking of the edges: a leading saw blade followed by a main saw blade. The leading saw blade is used to produce a slit in the edge of the board, the slit is slightly broader than the cut made by the main saw. The presence of the broader slit at the edge prevents the main saw blade form violently breaking the edge.

The leading saw usually comprises two blades adjacently arranged, and coupled by a locking bolt. The profile, and in other words the width of the slit corresponds to the main saw, being slightly broader than the profile of the main saw, leaving small room on either sides of the main saw, so as to allow the main saw to cut through the board within the boundaries of the slit, thus preventing violent chopping of the board's edge.

A common way of achieving this is to provide a combined leading saw comprised of the two saw blades coupled together while keeping a slight distance between them, in a manner which leaves the sawing teeth of the discs partially overlapping. By varying the distance between the discs the width of the combined saw can be adjusted according to the needs of the user. In most cases, the profile of the combined saw is determined by trial and error.

There are a few ways for changing the width of the leading saw. One of the simplest and popular solutions is to provide corresponding shims having different widths; the shims are positioned between the adjacent discs. This solution is highly time-consuming since the blades have to be separated each time the width needs to be changed, and in a trial and error process, it hinders the work.

Other solutions were introduces by Leitz and GUHDO® from Germany. In one of the solutions, a separator is installed between the blades and its width is adjustable to allow variations in the distance between the blades. The separator consists of numerous parts and is complicated, and therefore rather difficult to operate. Moreover, the separator is designed to work with certain types of circular saw blades machines but not with others and is therefore not universally applicable.

BRIEF DESCRIPTION OF THE INVENTION

It is an object of the present invention to provide a combined sawing device where the distance between the adjacent circular blades can be easily and conveniently changed.

It is another object of the present invention to provide a new and unique sawing device having adjustable profile whose width can be adjusted without dismantling the sawing blades and detaching the device from the seat in which it is inserted and rotated.

It is yet another object of the present invention to provide a new and unique sawing device having adjustable profile that has a universal mechanism that is adaptable to various types and sizes of circular saw blades.

It is therefore provided, in accordance with a preferred embodiment of the present invention, a means for adjusting a sawing device's width, wherein the sawing device comprises at least two circular blades facing each other and adjacently positioned, and a fastener adapted to assemble the blades together, the means for adjusting the sawing device's width comprising:
  a wavy annular spring provided between the blades;
  a recess provided in the blades, wherein said wavy annular spring is received within the recesses;
  an adjustment member adapted to force the blades together against said wavy annular spring or to part them so as to maintain a predetermined distance between the blades;

whereby the distance between the blades is set to present a desired cutting width.

Furthermore, in accordance with another preferred embodiment of the present invention, at least one pin is provided, the pins are accommodated in corresponding bores provided in the blades, and adapted to lock the blades in position preventing relative movement between the blades.

Furthermore, in accordance with another preferred embodiment of the present invention, said fastener is a disc-shaped member that is positioned adjacent to one of the blades, and wherein at least one screw fastens said fastener to oppositely positioned blade.

Furthermore, in accordance with another preferred embodiment of the present invention, said adjustment member is a ring positioned between said fastener and the adjacent blade, and wherein the ring is provided with a screw that can be screwed onto the fastener.

Finally, in accordance with another preferred embodiment of the present invention, said adjustment member is provided with a fastening screw that is adapted to fasten the adjustment member so as to ensure the maintenance of a predetermined distance between the blades.

BRIEF DESCRIPTION OF THE FIGURES

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF THE INVENTION AND FIGURES

The present invention introduces a new and unique sawing device having an adjustable profile. The adjustable sawing device may be used for many purposes such as cutting boards, grooving etc., providing a leading cut in a laminated board and similar tasks.

In one preferred embodiment of the adjustable sawing device of the present invention, the sawing device is especially adapted to act as a leading saw for sawing boards that are coated or laminated. Using the leading saw, the user forms a slit in the edge of the surface. The main cut of the surface is carried out through the slit and within its boundaries. The slit is slightly broader than the main cut and exposes the edge to the main cut so that the sawing device will not break pieces and splinters from the edges of the surface.

The sawing device of the present invention comprises two adjacently positioned disc blades. Both blades are facing each other and are concentrically connected. A spring element is provided between the disc blades so as to establish a changeable distance between the blades. The overall width of the sawing device is easily adjusted by pressing the two blades together against the spring element or releasing them. The adjustment of the sawing device width is continuous and is performed using the connector that connects the blades and the spring element together.

Figure 1:
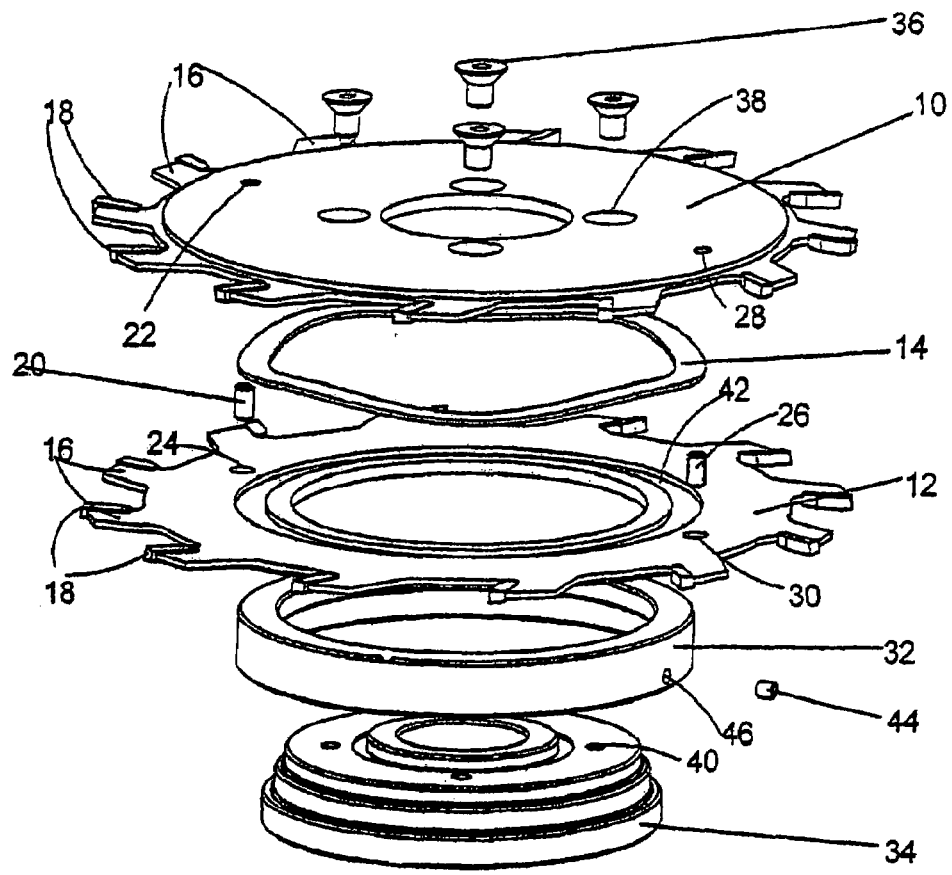
FIG. 1 illustrates an exploded view of an adjustable sawing device in accordance with a preferred embodiment of the present invention.

Reference is now made to FIG. 1 illustrating an exploded view of an adjustable sawing device in accordance with a preferred embodiment of the present invention. Two circular blades, a first circular blade 10 and a second circular blade 12 are positioned adjacently facing each other. First blade 10 and second blade 12 are concentrically connected and are adapted to revolve together. A spring element, preferably a wavy annular spring 14 is placed between blades 10 and 12. Due to the wavy structure of the spring, it maintains a certain distance between the two circular blades that can be narrowed by pressing the blades together against wavy annular spring 14. In this way, the cutting profile is changed according to the combined width of both disc blades' teeth tips 18, whose relative positions may vary between total or partial overlapping to no overlapping. Wavy annular spring 14 flattens upon applying pressure on it. Both circular blades 10 and 12 are provided with teeth 16 having tips 18 that are operated as small blades to cut the surface.

Pins are provided in corresponding bores drilled in both disc blades in order to prevent relative movement between the disc blades. Pin 20 is provided in bore 22 in circular blade 10 and bore 24 in circular blade 12. Pin 26 is provided in bore 28 in circular blade 10 and bore 30 in circular blade 12. Pins 20 and 26 hold the adjacent blades together so that when the sawing device is revolving, the two blades revolve together.

An adjustment ring 32 is provided between second circular blade 12 and a base 34 that keeps the sawing device's components assembled. Base 34 acts as a fastener that holds the components of the sawing device together. When the components are assembled, preferably four ellen screws 36 that pass through corresponding bores 38 in first circular blade 10 are screwed into corresponding recesses 40 in base 34 holding the base to its position.

Adjustment ring 32 is screwed to base 34 and positioned between the base and second circular blade 12 so that when adjustment ring 32 is turned, it presses second circular blade 12 towards first blade 10 and flattens wavy annular spring 14. As a result, the distance between both blades is decreased, and vise verse, turning adjustment ring 32 to the other side results in widening the gap between the blades. A fastening screw 44 is provided in a corresponding bore 46 in adjustment ring 32. Fastening screw 44 is adapted to tighten adjustment ring 32 to base 34 when the desired distance between the circular blades is achieved and the necessary profile is established. When the adjustment ring is fastened, the distance between the blades is determined and cannot be changed without releasing fastening screw 44.

Figure 2:
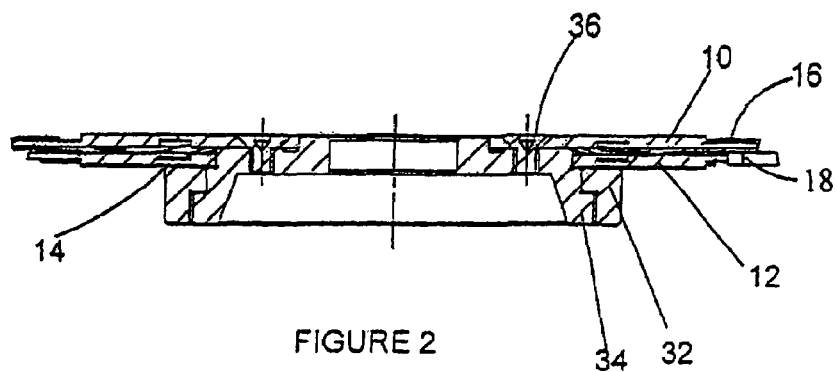
FIG. 2 illustrates a sectional view of the adjustable sawing device shown in FIG. 1, assembled.

Reference is now made to FIG. 2 illustrating a sectional view of the adjustable sawing device shown in FIG. 1. The assembled sawing device is shown in the figure. Ellen screws 36 are shown holding the assembly together, from the top of first circularc blade 10 to recess 40 in base 34. When the components of the sawing device are assembled, wavy annular spring 14 is confined in annular recess 42 in second blade 10 and in a similar recess in the opposite circular blade.

The present invention provides a sawing device having a cutting profile that can be easily adjusted according to the needs of the user. The sawing device of the present invention can be used for many purposes such as a leading sawing device, a cutting saw, or the like. Moreover, the addition of a wavy annular spring between the blades instead of attaching an additional part for width adjustment to the circular sawing device establishes a sawing device having a compact overall width that enables the sawing device to be mounted on any rotation machine without being confined to certain machines.

It is noted that a person skilled in the art could after reading the present specification and viewing the accompanying drawings, easily manufacutre a sawing device with more than two circular saw blades possesing the same adjustability feature, and the scope of the present invention is therefore not limited to two-blades configurations only.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A sawing device with an adjustable profile, the sawing device comprising:
   at least two adjacent and substantially parallel disk blades;
   a fastener for fastening the blades;
   a wavy annular spring located between the blades; and
   an adjustment member adapted to hold the blades locked forcing the blades together against said wavy annular spring or parting them so as to maintain a predetermined distance between the blades,
   whereby the distance between the blades is set to present a desired cutting width.

2. The device as claimed in claim 1, wherein an annular recess is provided in each of the blades, the annular recesses positioned substantially opposite to one another and wherein said wavy annular spring is received within the recesses.

3. The device as claimed in claim 1, wherein at least one pin is provided, accommodated in corresponding bores provided in the blades, and adapted to lock the blades in position preventing relative movement between the blades.

4. The device as claimed in claim 1, wherein said fastener comprises a disc-shaped member that is positioned adjacent to one of the blades, and wherein at least one screw fastens said fastener to oppositely positioned blade.

5. The device as claimed in claim 1, wherein said adjustment member comprises a ring positioned between said fastener and either of the blades, and wherein the ring is provided with a screw that can be screwed onto the fastener.

6. The device as claimed in claim 1, wherein said adjustment member is provided with a fastening screw that is adapted to fasten the adjustment member so as to ensure the maintenance of a predetermined distance between the blades.

* * * * *